United States Patent [19]

Miller et al.

[11] Patent Number: 4,470,260
[45] Date of Patent: Sep. 11, 1984

[54] OPEN CENTER LOAD SENSING HYDRAULIC SYSTEM

[75] Inventors: James A. Miller, Cedar Falls; Derek M. Eagles, Hudson, both of Iowa

[73] Assignee: Deere & Company, Moline, Ill.

[21] Appl. No.: 524,806

[22] Filed: Aug. 11, 1983

[51] Int. Cl.³ .................. F16D 31/00; B62D 5/08
[52] U.S. Cl. .................. 60/422; 60/384; 60/427; 91/518; 137/596.13; 180/132
[58] Field of Search .............. 60/422, 384, 385, 387, 60/420, 427; 91/514, 516, 517, 518; 180/132; 137/596, 596.13

[56] References Cited

U.S. PATENT DOCUMENTS

| | | | |
|---|---|---|---|
| 2,892,311 | 6/1959 | Van Gerpen | 60/52 |
| 2,892,312 | 6/1959 | Allen et al. | 60/52 |
| 3,750,405 | 8/1973 | Lech et al. | 60/422 |
| 4,034,563 | 7/1977 | Orth | 60/422 |
| 4,044,786 | 8/1977 | Yip | 137/101 |
| 4,116,001 | 9/1978 | Orth | 60/420 |
| 4,292,805 | 10/1981 | Acheson | 60/450 |
| 4,293,284 | 10/1981 | Carlson | 417/218 |
| 4,337,620 | 7/1982 | Johnson | 60/422 |
| 4,343,151 | 8/1982 | Lorimor | 91/516 |
| 4,345,614 | 8/1982 | Karlberg et al. | 60/384 |

Primary Examiner—Robert E. Garrett
Assistant Examiner—H. Edward Li

[57] ABSTRACT

An open center, load sensing hydraulic system is disclosed which contains a primary work circuit and a secondary work circuit. A fixed displacement pump is fluidly connected between a reservoir and both the primary and secondary work circuits for supplying pressurized fluid thereto. The primary work circuit includes a control valve which regulates fluid flow from the pump to a primary hydraulic function and which includes a feedback mechanism connected thereto. The secondary work circuit includes a manually operable control valve for regulating fluid flow from the pump to a secondary hydraulic function. A priority valve is connected between the pump and both the primary and secondary work circuits and is movable to regulate the pressure to the primary work circuit. Pressurized signals from the primary work circuit are transmitted through a load signal lne to the priority valve and are used to move the priority valve to a position which assures that adequate pressure is always available to the primary work circuit. The system also includes a control valve for sensing pressure variations between the fluid discharged from the priority valve and the fluid present in the load signal line. This valve prevents fluid flow out of the primary hydraulic function, via the load signal line, when the pressure of the fluid discharged by the pump is less than the pressure of the fluid in the load signal line and thereby essentially eliminates kickback from the primary control valve.

10 Claims, 1 Drawing Figure

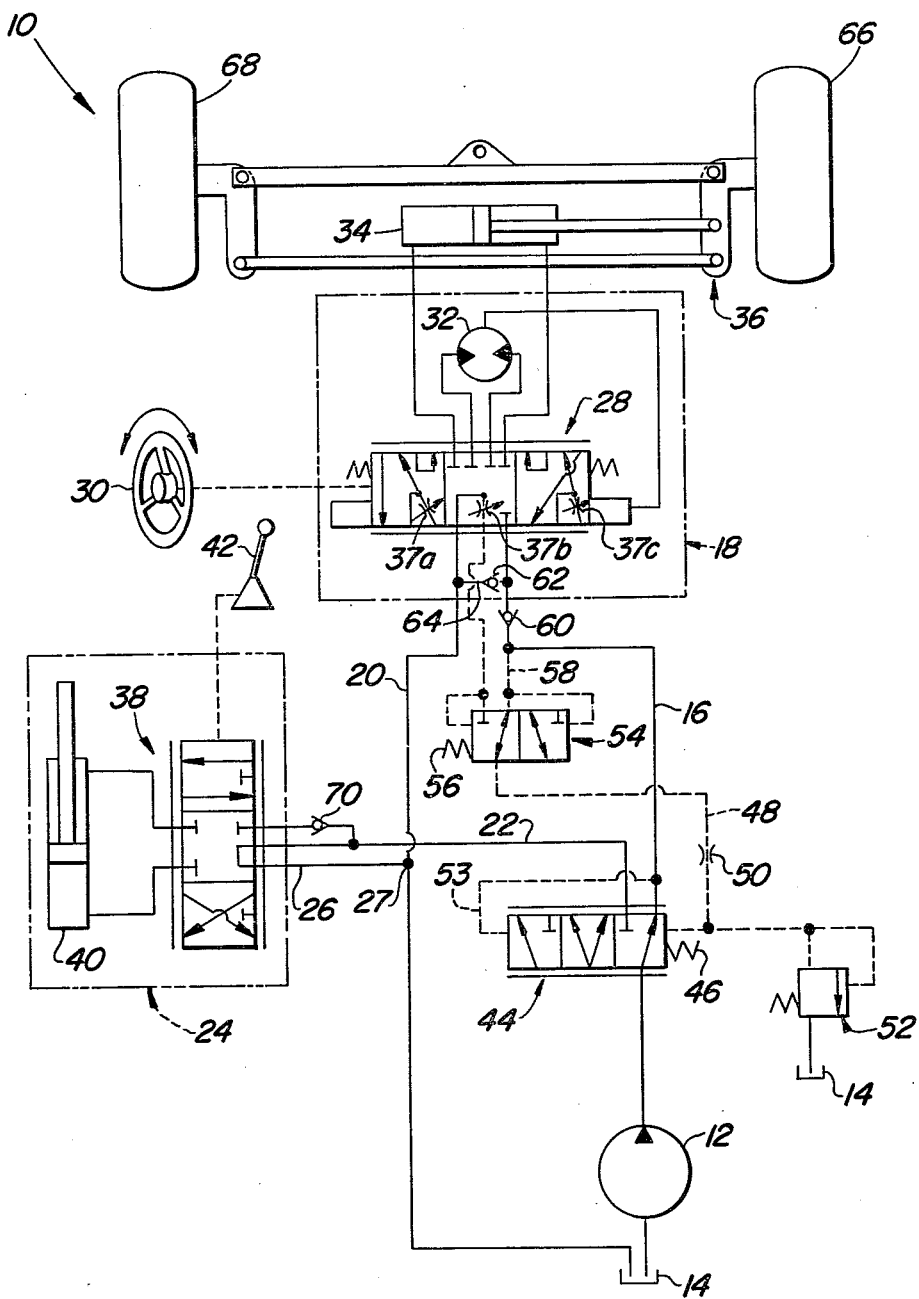

OPEN CENTER LOAD SENSING HYDRAULIC SYSTEM

FIELD OF THE INVENTION

This invention relates to an open center, load sensing hydraulic system which includes a priority-flow control valve and a load signal control valve to regulate fluid flow to various hydraulic functions.

BACKGROUND OF THE INVENTION

Currently, some agricultural and industrial equipment manufacturers design and construct vehicles which utilize open center hydraulic systems with a load sensing priority function such as steering. Such systems can experience a kickback problem in the steering control valve as pressure fluctuations occur within the system. Such kickbacks can become very annoying to the operator during operation of the vehicle. Most open center systems are not of the load sensing priority function design but those that are and have attempted to alleviate the kickback problem have proven to be complicated in construction and costly to produce. Now an open center, load sensing hydraulic system has been invented which will essentially eliminate kickback on the steering wheel.

SUMMARY OF THE INVENTION

Briefly, this invention relates to an open center, load sensing hydraulic system which assures that a primary work circuit has priority in flow demand over a secondary work circuit and which essentially eliminates kickback from a control valve having a feedback mechanism contained therein. The system includes a fixed displacement pump fluidly connected between a reservoir and a control valve of the primary work circuit. A priority valve is connected between the pump and both the primary and secondary work circuits and is movable to regulate fluid pressure to the primary work circuit. A load signal line is also present in the system which connects the control valve of the primary work circuit to the priority valve. The load signal line is capable of conveying pressurized fluid to one end of the priority valve to cause movement thereof. Such movement can connect the pump directly to the primary work circuit and restricts flow to the secondary work circuit thereby assuring that, in certain operations, adequate fluid pressure is always available to the primary work circuit. The system further includes a load signal control valve for sensing pressure variations between fluid routed to the primary work circuit and fluid in the load signal line and is movable in response to such pressure variations to prevent fluid flow out of the primary work circuit, via the load signal line, when the pressure of the fluid routed to the primary work circuit is less than the pressure of the fluid in the load signal line. This essentially eliminates kickback from the primary control valve.

The general object of this invention is to provide an open center, load sensing hydraulic system which assures that a primary work circuit has priority in flow demand over a secondary work circuit. A more specific object of this invention is to provide an open center, load sensing hydraulic system which eliminates kickback from a feedback mechanism contained in a manually operable control valve fluidly connected to a primary hydraulic function.

Another object of this invention is to provide a simple and economical open center, load sensing hydraulic system.

Still further an object of this invention is to provide an open center, load sensing hydraulic circuit which includes a priority-flow control valve.

Other objects and advantages of the present invention will become more apparent to those skilled in the art in view of the following description and the accompanying drawing.

BRIEF DESCRIPTION OF THE DRAWING

The FIGURE is a schematic diagram of an open center, load sensing hydraulic system including a priority-flow control valve.

DETAILED DESCRIPTION OF THE PREFERRED EMBODIMENT

Referring to the FIGURE, an open center, load sensing hydraulic system 10 is shown which controls the steering of a vehicle, for example, an agricultural or industrial tractor. The system 10 includes a fixed displacement pump 12 which is fluidly connected to a reservoir 14. Pressurized fluid is directed from the pump 12 through a first conduit 16 to a primary work circuit 18 and return flow is routed through a second circuit 20 back to the reservoir 14. The pump 12 is also connected by a third conduit 22 to a secondary work circuit 24, which in turn is connected by a fourth conduit 26, joined as at point 27, to the conduit 22 which extends to the reservoir 14.

The open center, load sensing hydraulic system 10 is designed such that the primary work circuit 18 has priority over the secondary work circuit 24. Although as depicted, the primary work circuit 18 is a steering circuit, other hydraulic circuits could also be utilized as the primary circuit. As shown, the primary work circuit 18 includes a steering valve 28 which is movably actuated by a manually operable steering wheel 30 and by a fluidly activated gerotor 32. The fluid output of the steering valve 28 is directed to the ends of a hydraulic cylinder 34 so as to control the movement of a steering linkage 36. The physical construction and connection of the steering valve 28 to the gerotor 32 and to the hydraulic cylinder 34 are all well-known to those skilled in the art. It should be noted, however, that the steering valve 28 is shown as being a three-position valve having three distinct orifices 37a, b, and c, for metering fluid flow therethrough.

The secondary work circuit 24 also contains a hydraulic valve 38 which is fluidly connected to the ends of a hydraulic cylinder 40. The hydraulic cylinder 40 can be used in numerous applications, for example, the raising or lowering of an implement which is attached to the vehicle. Preferably, the hydraulic valve 38 will be activated by a lever mechanism 42.

A priority valve 44 is positioned across the first conduit 16 and is movable to regulate the pressure downstream thereof in the first conduit 16. Preferably, the priority valve 44 is a three-way, three-position priority-flow control valve which is normally biased by a spring 46 to a first position (as shown). In the first position, the priority valve 44 directs all of the fluid discharged by the pump 12 through the first conduit 16 to the primary work circuit 18. As the priority valve 44 is shifted by fluid pressure towards a second position, the fluid discharged by the pump 12 is directed to both the primary and secondary work circuits 18 and 24, respectively.

The priority valve 44 is also movable to a third position, wherein all of the flow discharged by the pump 12 is directed to the secondary work circuit 24. Movement of the priority valve 44 is partially controlled by pressure signals generated by loads acting on the hydraulic cylinder 34 and which are routed through a load signal line 48. The load signal line 48 directs fluid to the right-hand end of the priority valve 44 and cooperates with the spring 46 to urge the priority valve towards its first position. This assures that adequate fluid flow and pressure is always available from the pump 12 to the primary work circuit 18.

An orifice 50 is positioned across the load signal line 48 to meter flow therethrough and a relief valve 52 is arranged downstream of the orifice 50 and in a parallel relationship with the priority valve 44. The relief valve 52 is spring biased to a closed position and is activated by the fluid pressure downstream of the orifice to open and relieve pressurized fluid above a predetermined value. The excess fluid is then returned to the reservoir 14 so that it can be used again. The system 10 also includes a pilot line 53 which connects the first conduit 16, downstream of the priority valve 44, to the left-hand end of the priority valve 44. As the pressure builds in the first conduit 16, a pressure signal is transmitted to the left-hand end of the priority valve 44 and acts to offset the force of the spring 46 and the pressure signals in the load signal line 48. When the force exerted on the left-hand end exceeds the right-hand force, the priority valve 44 will move rightward towards its second or third positions.

In such a priority load steering system, when a combination of a reverse pressure difference across and a reverse flow through the gerotor 32 occurs, a torque develops which causes the steering valve 28 to rotate in a direction opposite to the direction in which the operator has turned the steering wheel 30. This opposite rotation of the steering valve 28 causes a kickback of the steering wheel 30 and this is undesirable. The present open center, load sensing hydraulic system 10 eliminates this kickback by using a load signal control valve 54 which is located across the load signal line 48 between the primary work circuit 18 and the orifice 50. The load signal control valve 54 is preferably a three-way, two-position valve which is biased by a spring 56 and by fluid pressure in the load signal line 48 to a first position (as shown) wherein the first conduit 16 is fluidly connected by a line 58 to the load signal line 48. The control valve 54 is movable to a second position by fluid pressure which is transmitted from the first conduit 16, through the line 58, to the right-hand end of the control valve 54. In the second position, the steering valve 28 is fluidly connected by the load signal line 48 to the right-hand end of the priority valve 44.

The load signal control valve 54 is capable of sensing pressure variations between the fluid in the first conduit 16 and the fluid in the load signal line 48 and is movable relative to such pressure variations to prevent fluid flow out of the primary work circuit 18 when the fluid pressure in the first conduit 16 is less than the fluid pressure in the load signal line 48. By preventing fluid flow out of the steering valve 28, one eliminates this flow path for reverse fluid flow through the gerotor 32. The open center, load sensing hydraulic system 10 further includes a one-way check valve 60 positioned in the first conduit 16 between the point where the control valve 54 is connected to the first conduit 16 and the point where the first conduit 16 is connected to the steering valve 28. This check valve 60 prevents the reverse flow of fluid out of the primary work circuit 18 through the first conduit 16. The control valve 54 and the one-way check valve 60 cooperate to prevent kickback at the steering wheel 30.

A second one-way check valve 62 is positioned in a line 64 which connects the first and second conduits 16 and 20, respectively. The check valve 62 permits fluid flow from the second conduit 20 to the first conduit 16 should the operator's input to the steering wheel 30 cause a greater fluid demand than is available from the pump 12. When this occurs, flow normally routed back to the reservoir 14 is used to fill the first conduit 16 and thereby prevent the first conduit 16 from cavitating.

The open center, load sensing hydraulic system 10 also includes right and left wheels 66 and 68 which are mounted on the linkage 36. Lastly, a lift check valve 70 is associated with the secondary work circuit 24 and prevents the reverse flow of fluid out of the secondary control valve 38.

OPERATION

The operation of the open center, load sensing hydraulic system 10 will now be explained using various pressure values which are assigned to triggering the movement of certain valves in order to acquaint the reader with the system. It should be understood that the invention is not limited to these hypothetical values.

Starting from a condition wherein the engine of the vehicle is not running, the pump 12 will not be operating. At this time, the steering valve 28 will be in its neutral position, the hydraulic cylinder 34 is depressurized, and both the priority valve 44 and the control valve 54 will be in their first positions, all of which are indicated in the drawing. As soon as the operator starts the engine, the pump 12 will supply pressurized fluid to the steering valve 28 via the first conduit 16. Since the steering valve 28 is in its neutral position, fluid flow through the steering valve 28 will be blocked and the fluid pressure will rise within the first conduit 16. As the pressure rises and reaches about 50 psi, which represents the force needed to compress the spring 56, the control valve 54 will shift leftwards to a second position. In the second position, the control valve 54 blocks the flow of pressurized fluid from the first supply line 16 to the load signal line 48 and permits the fluid in the load signal line 48 to be drained off to the reservoir 14 via the orifice 37b and the return line 20. As the pressure discharged from the pump 12 builds to about 150 psi, this pressure will be conveyed through the pilot line 53 to the left-hand end of the priority valve 44 and will move the priority valve 44 rightwards towards its second position against the force of the spring 46. It should be noted that a pressure of about 150 psi on the left end of the priority valve 44 is required to overcome the force of the spring 46. With movement of the priority valve 44 towards the second position, fluid is routed to both the primary and secondary work circuits 18 and 24, respectively. Since the control valve 38 of the secondary work circuit 24 is still in its neutral position (as shown), the fluid will not be able to pass through the control valve 38 to the hydraulic cylinder 40 but instead is routed back to the reservoir 14 via the return lines 26 and 20. The open center, load sensing hydraulic system 10 is now in a standby condition.

NORMAL STEER OPERATION

The open center, load sensing hydraulic system 10 will function as follows when fluid is required by the primary work circuit 18 while the hydraulic valve 38 of the secondary work circuit 24 is in its neutral position. Starting from the standby condition wherein the control valve 54 is in its second position and the priority valve 44 has moved towards its second position, fluid flow from the pump 12 will be directed towards both the primary and secondary work circuits 18 and 24, respectively. At this time, should the operator desire to turn the vehicle wheels 66 and 68 to the right, he would turn the steering wheel 30 rightwards. By turning the steering wheel 30 rightwards, the steering valve 28 is moved rightward such that the first supply line 16 is fluidly connected through the orifice 37a to the left-hand side of the gerotor 32. The right-hand side of the gerotor 32 is fluidly connected to the rod end of the hydraulic cylinder 34 and the head end of the hydraulic cylinder 34 is fluidly connected by the return line 20 to the reservoir 14.

If we assume that the pressure needed to move the piston within the hydraulic cylinder 34 is 900 psi, then the pressure from the pump 12 must be increased from the 150 psi standby pressure to the 900 psi value before the wheels 66 and 68 will begin to turn. With the pressure at only 150 psi, the piston within the hydraulic cylinder 34 will not be movable by the fluid pressure and therefore the fluid would flow past the orifice 37a, via the load signal line 48, to the left-hand end of the control valve 54. This fluid pressure, together with the force of the spring 56, will urge the control valve 54 to its first position, as shown. With the control valve 54 in its first position, the fluid pressure in the first supply line 16 will be connected by the load signal line 48 to the priority valve 44. The pressure of the fluid in the load signal line 48, together with the force of the spring 46, will cause the priority valve 44 to move leftwards towards its first position. This movement further restricts flow to the secondary work circuit 24 resulting in a rise in pressure in the first conduit 16. When the pressure in the first conduit 16 reaches approximately 900 psi, fluid will begin to flow through the steering valve 28 to the rod end of the hydraulic cylinder 34. The 900 psi pressure value will also be sensed by the load signal line 48 and this increase in pressure will cause the priority valve 44 to continue moving towards its first position. Once the pressure in the first supply line 16 reaches a value of about 950 psi, resulting in a 50 psi pressure drop across the orifice 37a and remembering that it takes 50 psi to compress the spring 56, the control valve 54 will shift to its second position. The pressure in the first supply line 16 will continue to increase to say about 1050 psi, which is equal to the 900 psi coming from the steering load via the load signal line 48 to the right side of the priority valve 44 plus the 150 psi which represents the force of the spring 46. As long as the operator continues to turn the steering wheel 30 rightwards, the above condition will be maintained.

Once the operator stops turning the steering wheel 30, the primary control valve 28 will move to its neutral position and the fluid in the load signal line 48 will drain back through the orifice 37b and the return line 20 to the reservoir 14. When this happens, the pressure in the load signal line 48 will drop to essentially zero. As the pressure in the load signal line 48 decreases, the priority valve 44 will move rightwards towards its second position due to the pressure in the pilot line 53. As the priority valve 44 moves towards the second position, the restriction between the pump 12 and the third conduit 22 is reduced thereby again establishing the standby condition mentioned above.

STEERING WHEN THE SECONDARY FUNCTION IS IN USE AND AT A HIGHER PRESSURE THAN NEEDED FOR STEERING

Should a situation arise wherein the load on the secondary function is approximately 2000 psi and then the operator wishes to steer the vehicle, the following sequence would occur. Starting from the standby condition, the operator would move the lever 42 which in turn would cause the control valve 38 to move downward. As the control valve 38 moves downward, the flow of fluid from the third conduit 22 to the return line 26 is blocked and this results in a rise in the pressurized fluid directed to the control valve 38. As this pressure rises, the priority valve 44 will shift towards its third position wherein essentially all of the fluid is directed to the secondary work circuit 24 at 2000 psi. It should be noted that the pressure within the first conduit 16 is still at 150 psi since the priority valve 44 is in its third position. At this time, should the operator desire to steer the wheels 66 and 68 to the right, he would turn the steering wheel 30 rightward and the control valve 28 would move rightward. With the orifice 37a connected to the first supply line 16, the fluid at 150 psi will be directed through the gerotor 32 to the rod end of the hydraulic cylinder 34. Since the pressure is inadequate to move the piston within the hydraulic cylinder 34, the fluid will be directed through the orifice 37a and the load signal line 48 to the left-hand side of the control valve 54. This increase in fluid pressure together with the force of the spring 56, will cause the control valve 54 to move back to its first position whereby the pressure in the first supply line 16 is conveyed via the load signal line 48 to the right-hand side of the priority valve 44. This pressure will cause the priority valve 44 to move leftwards away from the third position and the pressure in the first supply line 16, downstream of the priority valve 44, will increase while the pressure in the second supply line 22 remains essentially constant at 2000 psi. As the pressure rises above the 900 psi value, which represents the pressure needed to move the piston within the hydraulic cylinder 34, and increases to 950 psi, the control valve 54 will move to its second position. The pressure in the first conduit 16 will continue to increase to 1050 psi at which time the priority valve 44 will modulate to maintain the 1050 psi value in the first conduit 16 downstream of the priority valve 44. As long as the operator continues to turn the steering wheel 30 rightward, fluid will be directed through the first supply line 16 at 1050 psi and fluid will be directed through the secondary supply line 22 at 2000 psi.

Once the operator stops turning the steering wheel 30, the primary control valve 28 will move to its neutral position and the fluid in the load signal line 48 will drain back through the orifice 37b and the return line 20 to the reservoir 14. When this happens, the pressure in the load signal line 48 will drop to essentially zero and the priority valve 44 will move back towards its third position. When this occurs, fluid flow will be directed to the first supply line 16 at 150 psi and fluid flow will be routed to the secondary work circuit 24, via line 22, at 2000 psi.

STEERING AGAINST A FORCE ACTING ON THE WHEELS

Should a situation arise wherein an external force is acting on at least one of the wheels, for example, when one of the wheels is in a rut and has an external force acting on it such as to force it to the left, and the operator tries to turn the steering wheel 30 to the right, the hydraulic system 10 would function in the following way. Starting from the standby position, the steering valve 28 will move to the right such that the orifice 37a is aligned with the first supply line 16 and the pressurized fluid therein will be fluidly connected to the rod end of the hydraulic cylinder 34, via the gerotor. At the same time, the head end of the hydraulic cylinder 34 will be fluidly connected to the reservoir 14 via the return line 20. Pressurized fluid in the rod end of the hydraulic cylinder 34, which incidentally will be higher than system pressure, will feed back through the gerotor 32 and through the load signal line 48 to the left-hand end of the control valve 54. This pressurized fluid, which is at a higher pressure than the fluid in the first supply line 16, will cause the control valve 54 to move rightwards towards its first position, as shown. With the control valve 54 in its first position, reverse flow of fluid out of the rod end of the hydraulic cylinder 34 and through the gerotor 32 is prevented. By eliminating the reverse flow of fluid through the gerotor 32, kickback at the steering wheel 30 is eliminated.

Once the control valve 54 has moved to its first position, the hydraulic system 10 will operate as described above in the section entitled "Normal Steer Operation".

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

We claim:

1. An open carrier, load sensing hydraulic system comprising:
    (a) a reservoir capable of holding a quantity of fluid;
    (b) a fixed displacement pump fluidy connected to said reservoir;
    (c) a primary work circuit fluidly connected to said pump, said primary work circuit including a primary control valve with a feedback mechanism connected thereto, said primary control valve regulating fluid flow from said pump to a primary hydraulic function;
    (d) a secondary work circuit fluidly connected to said pump, said secondary work circuit including a manually operable secondary control valve for regulating fluid flow from said pump to a secondary hydraulic function;
    (e) a priority valve connected between said pump and both said primary and secondary work circuits, said priority valve being movable to regulate fluid pressure from said pump to said primary work circuit;
    (f) a load signal line connecting said control valve of said primary work circuit to said priority valve, said load signal line being capable of transmitting pressure signals to said priority valve to control movement thereof, thereby assuring that adequate fluid pressure is available from said pump to said primary work circuit; and
    (g) means for sensing pressure variations between fluid routed to said primary work circuit and fluid present in said load signal line, said means being movable relative to such pressure variations to prevent fluid flow out of said primary work circuit, via said load signal line, when the pressure of said fluid routed to said primary work circuit is less than the pressure of said fluid in said load signal line thereby essentially eliminating kickback from said primary control valve.

2. The open center, load sensing hydraulic system of claim 1 wherein said means is a three-way, two-position valve.

3. The open center, load sensing hydraulic system of claim 1 wherein said priority valve is a three-way, three-position valve.

4. The open center, load sensing hydraulic system of claim 3 wherein said priority valve is located immediately downstream from said pump.

5. The open center, load sensing hydraulic system of claim 4 wherein said priority valve is spring-biased toward a first position where all of said fluid discharged by said pump is routed through said priority valve to said primary work circuit.

6. An open center, load sensing hydraulic system which assures that a primary work circuit has priority in flow demand over a secondary work circuit and which essentially eliminates kickback from a primary control valve with a feedback mechanism contained in said primary work circuit, said system comprising:
    (a) a reservoir capable of holding a quantity of fluid;
    (b) a fixed displacement pump fluidly connected to said reservoir;
    (c) first and second fluid conduits connecting said pump to said primary control valve and said primary control valve to said reservoir, respectively;
    (d) a priority valve connected across said first conduit and regulating fluid pressure discharged by said pump;
    (e) third and fourth fluid conduits connecting said priority valve to a secondary control valve contained in said secondary work circuit and connecting said secondary control valve to said reservoir, respectively;
    (f) a load signal line connecting said primary work circuit to a first end of said priority valve for transmitting pressurized fluid thereto which urges said priority valve to a first position wherein said pump is connected by said first conduit to said primary work circuit thereby assuring that adequate fluid pressure is available to said primary work circuit;
    (g) an orifice positioned across said load signal line for metering fluid flow therethrough;
    (h) a relief valve positioned downstream of said orifice and in parallel with said priority valve, said relief valve being set to relieve pressure above a predetermined value from said load signal line;
    (i) a pilot line connecting said first conduit downstream of said priority valve to a second end of said priority valve, fluid pressure in said pilot line causing said priority valve to shift toward a position permitting fluid flow to said secondary work circuit; and
    (j) valve means for sensing pressure variations between fluid present in said first conduit and fluid present in said load signal line and being movable in response to such pressure variations to prevent fluid flow out of said primary work circuit via said load signal line when the fluid pressure present in said first conduit is less than the fluid pressure present in said load signal line.

7. The open center, load sensing hydraulic system of claim 6 wherein said valve means is a three-way, two-position load signal control valve.

8. The open center, load sensing hydraulic system of claim 6 wherein said priority valve is a three-way, three-position valve.

9. The open center, load sensing hydraulic system of claim 8 wherein said priority valve is located immediately downstream from said pump.

10. The open center, load sensing hydraulic system of claim 9 wherein said priority valve is spring biased toward a first position wherein all of said fluid discharged by said pump is routed through said priority valve to said primary work circuit.

* * * * *

UNITED STATES PATENT AND TRADEMARK OFFICE
CERTIFICATE OF CORRECTION

PATENT NO. : 4,470,260

DATED : 11 September 1984

INVENTOR(S) : James A. Miller and Derek M. Eagles

It is certified that error appears in the above-identified patent and that said Letters Patent is hereby corrected as shown below:

Column 7, line 43, delete "carrier" and insert -- center --.

Column 8, line 24, delete "where" and insert -- wherein --.

Signed and Sealed this

Nineteenth Day of March 1985

[SEAL]

Attest:

DONALD J. QUIGG

Attesting Officer     Acting Commissioner of Patents and Trademarks